United States Patent [19]

Kinney, Jr. et al.

[11] Patent Number: 4,519,823
[45] Date of Patent: May 28, 1985

[54] AIR FILTER ASSEMBLY HAVING IMPROVED CLAMPING MEANS FOR FILTER MEDIA

[75] Inventors: William L. Kinney, Jr.; Richard E. Evans, Jr., both of Charlotte, N.C.

[73] Assignee: United Air Filter Company, Charlotte, N.C.

[21] Appl. No.: 475,764

[22] Filed: Mar. 16, 1983

[51] Int. Cl.³ .............................................. B01D 46/00
[52] U.S. Cl. ......................................... 55/493; 55/501; 55/509; 55/511; 24/67.5
[58] Field of Search .................. 55/493, 497, 499, 500, 55/501, 504, 509, 521; 160/269, 369, 368 R, 399, 402; 24/489, 512, 67.5, 67.7

[56] References Cited

U.S. PATENT DOCUMENTS

| | | | |
|---|---|---|---|
| 2,635,318 | 4/1953 | Gloss | 24/489 |
| 2,879,568 | 3/1959 | Killen | 24/67.5 |
| 3,058,279 | 10/1962 | Metcalfe | 55/495 |
| 3,093,401 | 6/1963 | Hagendoorn | 55/493 |
| 3,142,550 | 7/1964 | Kuehne | 55/495 |
| 3,470,680 | 10/1969 | Avera | 55/497 |
| 3,553,942 | 1/1971 | Harrington et al. | 55/493 |

Primary Examiner—Bernard Nozick
Attorney, Agent, or Firm—Bell, Seltzer, Park & Gibson

[57] ABSTRACT

A filter assembly having clamping means for resiliently engaging marginal areas of the filter media and wherein the clamping means comprises elongate members engaging material facial portions of the filter media and clips supportingly carrying the elongate members with each of the clips having an arm connected to the elongate members and being pivotally movable to first and second positions and wherein in the first position the elongate members carried by respective arms are in biased clamping engagement with the filter media and wherein in the second position the elongate members are away from and out of clamping engagement with the filter media to facilitate replacement thereof.

9 Claims, 9 Drawing Figures

U.S. Patent   May 28, 1985   Sheet 1 of 2   4,519,823
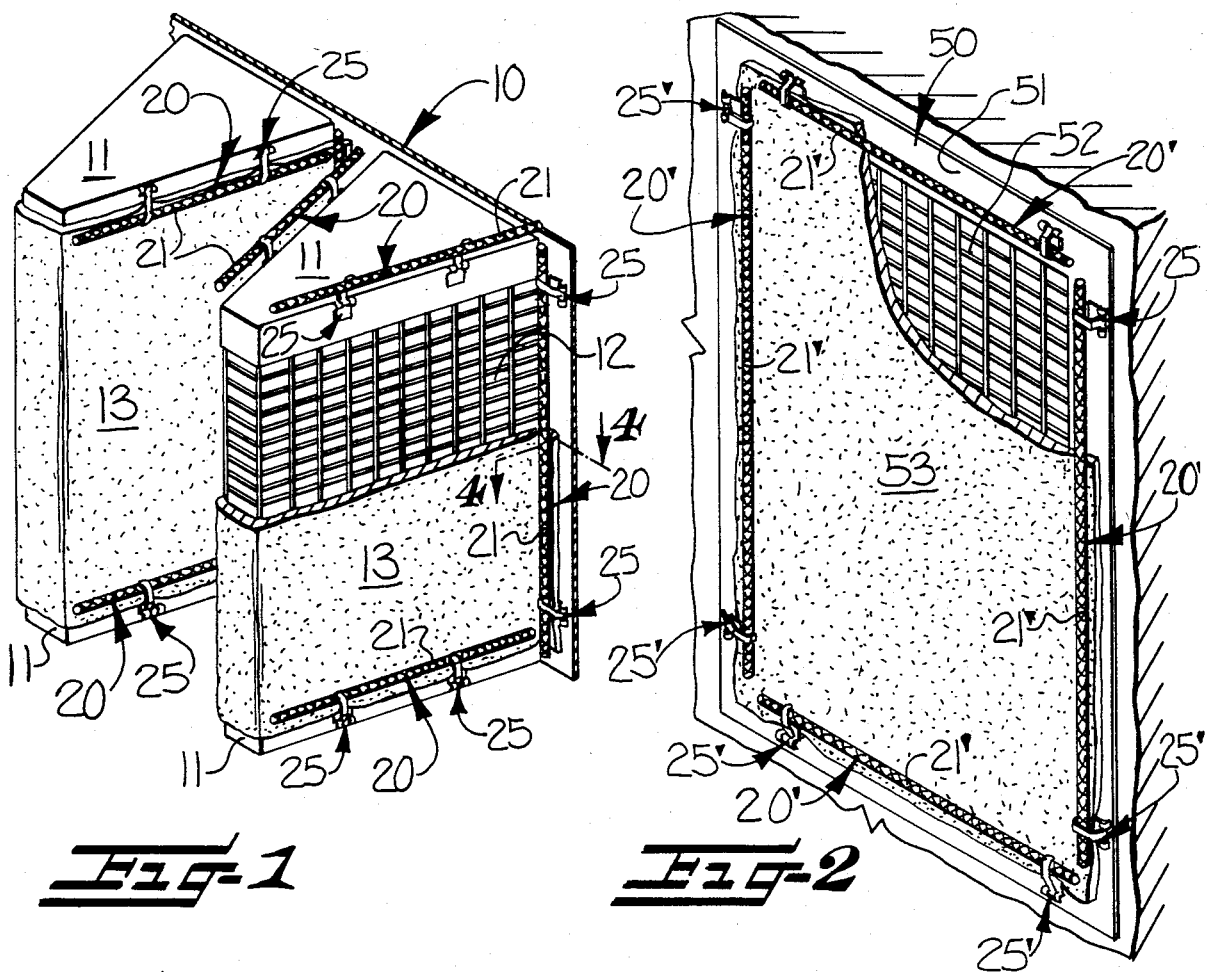
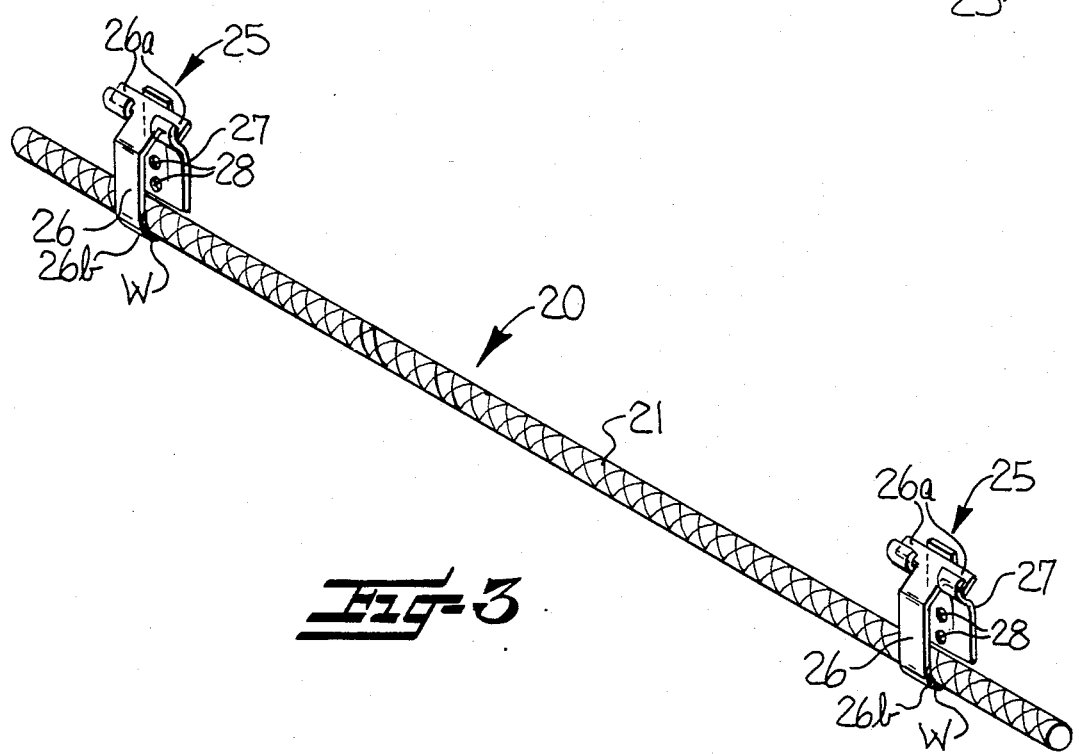

AIR FILTER ASSEMBLY HAVING IMPROVED CLAMPING MEANS FOR FILTER MEDIA

This invention relates to air filters and more particularly to a filter assembly having clamping means for engaging a filter body of fibrous filter media, and wherein the clamping means is so constructed as to greatly facilitate the initial positioning of such filter body and the replacement thereafter.

Heretofore, it has been the practice to utilize as the clamping means for retaining a filter body on a filter assembly, a retainer strip, normally formed of plastic, and having a pair of inwardly turned walls which form a slotted wall into which the edges of the filter body are positioned for securement. This practice has been widely used, not only with V-cell filters as disclosed in U.S. Pat. Nos. 3,470,680 and 3,984,221, but also in flat filters such as that disclosed in U.S. Pat. No. 3,293,834. To those conversant with this filter art and the use of such retainer strips, it has long been recognized that considerable time and difficulty is incurred in removing filter bodies and replacing the same. When filter bodies are replaced, it will be understood that the same are usually quite dirty with the collected dirt thereon and it has been exceedingly difficult to remove such filter bodies intact without rupturing and tearing due to the pinching holding action of the edge of the filter media within the slotted walls of the retainer strip material.

Also, the filter media usable with the prior art slotted plastic retainer strips was usually limited to relatively high tensile strength filter media to avoid rupturing and tearing during the pulling action in removing old filter media. The more common high efficiency fiberglass filter media was not suitable due to its being of too low tensile strength. Further, the filter media of the prior art was limited to a lofty construction to provide the desired bulk for being compressed and pinchingly held within the slotted plastic retainer strips.

Further, while the problem of removal of old filter media is quite difficult, as indicated, the replacement of the old filter media with the new filter media typically entails the use of a special tool which takes the form of a thin, flat wheel supportingly carried by a bifurcated shank portion having a handle thereon. Such tools are sometimes termed pizza cutters since a tool of this type is widely used in the pizza food field.

With the foregoing in mind, it is the primary feature of this invention to provide an improved clamping means for the filter media which does not necessitate any special tool for placing the new filter media in position and which permits the old filter media to readily be removed very quickly, and without any danger or likelihood of tearing the old filter media and the scattering of the collected dirt therefrom. Further, with this invention the selection of filter media is widened since the tensile strength is no longer critical to prevent tearing or rupturing when removing old filter media.

The improved clamping means of this invention broadly takes the form of elongate members extending substantially parallel to marginal edge portions of the filter body with such elongate members being suitably connected to and carried by pairs of clips which clips have an arm connected to the elongate members as by welding and which arms are pivotally movable to first and second positions and wherein, in the first position, the elongate members carried by the respective arms are in biased clamping engagement with the filter body and wherein, in the second position, the elongate members are away from and out of clamping engagement with the filter body to facilitate replacement of the filter body. This pivotal movement of the arms to the respective positions is readily accomplished by one manually grasping the elongate members and utilizing the same as a handle for pivotally swinging the same to the desired one of the two positions.

Some of the features of the present invention having been stated, others will be more clearly and fully set forth in the following specification and claims wherein:

FIG. 1 is a perspective view, with parts broken away, showing several units of a so-called V-cell type of filter incorporating this invention;

FIG. 2 is a perspective view, with parts broken away, showing a flat type of filter unit incorporating this invention;

FIG. 3 is an enlarged perspective view of the clamping means present in FIGS. 1 and 2;

Figure 4:
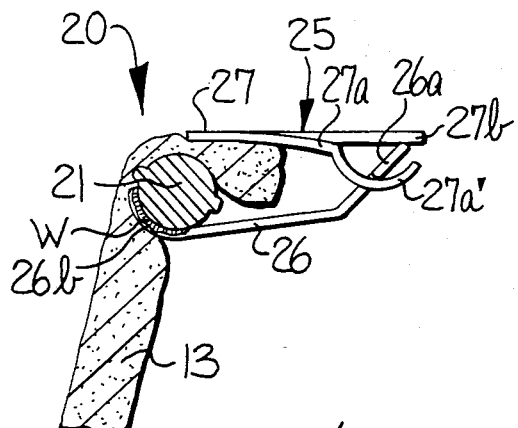
FIG. 4 is an enlarged sectional view taken substantially along line 4—4 of FIG. 1 and illustrating the clamping means in biased clamping engagement with the filter body.

Referring now more particularly to the drawings and especially to FIGS. 1 and 2, it will be noted that two types of filter assemblies have been disclosed, FIG. 1 being of the V-cell type broadly indicated by reference numeral 10, and FIG. 2 being of the flat type broadly indicated by reference numeral 50.

As illustrated in FIG. 1 the V-cell type filter assembly 10 includes a supporting frame 11 having a foraminous filter body support 12 in the form of screen wiring carried by the frame 11, and a filter body 13 formed of resilient filter media overlying the screen wiring support 12.

The filter body 13 of this invention may be formed of any suitable filter media including woven, nonwoven, or bonded materials whether of loft or non-loft construction. Further, the tensile strength of the filter media is no longer critical as is the case in the prior art to prevent rupturing and tearing of the old filter when being removed from the slotted plastic retainer strips.

To maintain the filter body 13 in overlying relationship to the foraminous filter body support 12, a plurality of clamping means 20 are provided around and adjacent to the peripheral edges of the filter body. As best illustrated in FIGS. 3–9, each of the clamping means 20 takes the form of elongate members or rods 21 extending substantially parallel to marginal edge portions of the filter body 13 and normally engaging marginal facial portions of the filter media forming the filter body 13. Pairs of spaced clips 25 supportingly carry each of the elongate members 21, each clip having an arm 26 with a widened base portion 26a, and an outer curved end 26b weldably secured at W to the elongate member 21.

Figure 5:
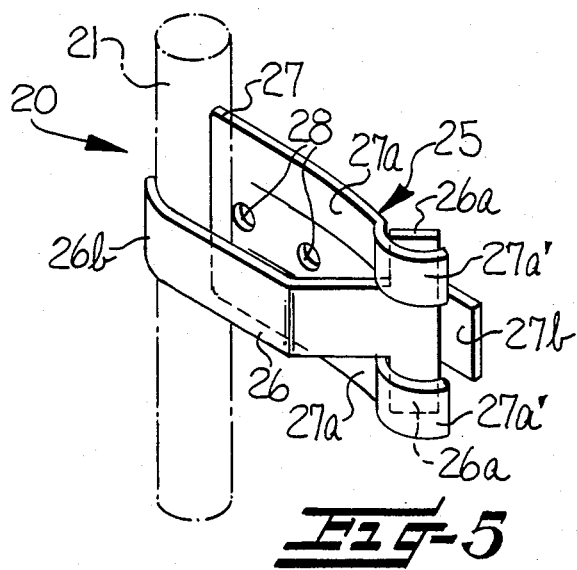
FIG. 5 is a perspective view of the clip and elongate member of the clamping means in the clamping position corresponding to FIG. 4.
Figure 7:
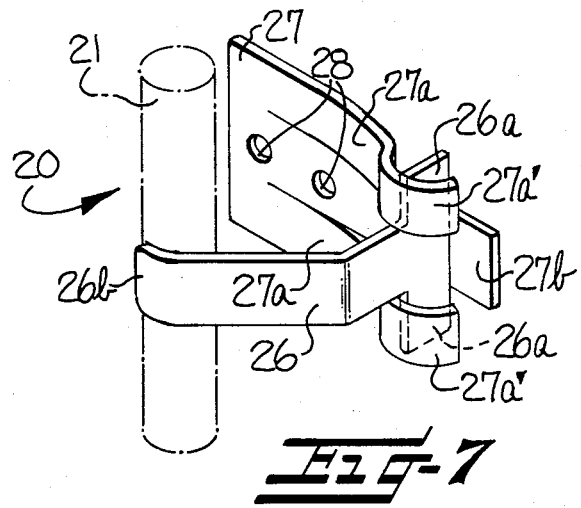
FIG. 7 is a perspective view corresponding to FIG. 5, but showing the clip of the clamping means in the intermediate open position of FIG. 6.
Figure 9:
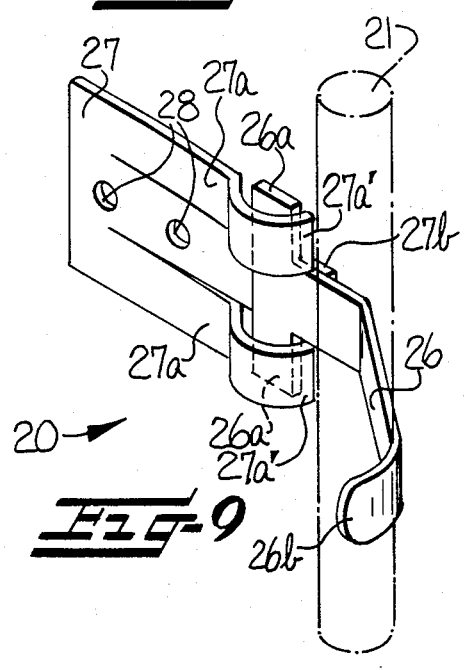
FIG. 9 is a perspective view similar to FIG. 7 but showing the clip of the clamping means in fully opened condition.

For mounting the clips 25 and for pivotally carrying said arms 26, each clip has a supporting element 27 which is provided with a pair of holes 28 therein for fasteners or rivets for the mounting of the clips 25 on the supporting frame 11. As best seen in FIGS. 5, 7 and 9, each of the supporting elements 27 comprises a plate having a plurality of resilient fingers 27a and 27b extending therefrom, the fingers 27a being two in number and positioned on the opposite side of the arm base portion 26a from the single finger 27b. By this arrangement, it will be understood that arm 26 is grippingly held for pivotal movement between the fingers positioned on opposite sides thereof. It will further be noted that the pair of fingers 27a have curved outer end portions 27a' thereon to aid in retaining the base portion 26a of the arm 26 between the resilient fingers 27a and 27b and to also facilitate pivotal movement of the arm 26.

Figure 6:
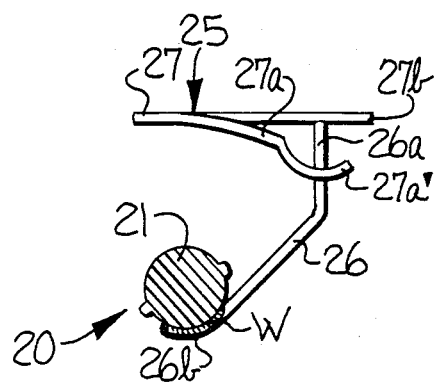
FIG. 6 is a sectional view similar to FIG. 4, but without the filter body, and showing the clamping means in an intermediate open position for readily permitting removal or replacement of the filter body.
Figure 8:
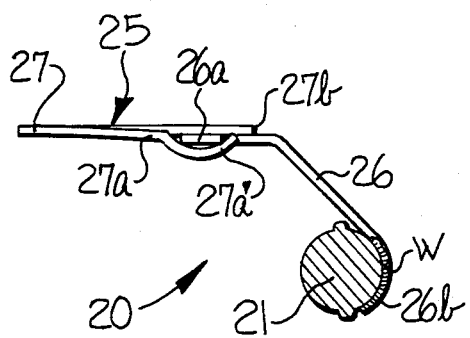
FIG. 8 is a view similar to FIG. 6 but showing the clip of the clamping means in fully opened position wherein the elongate member carried by the clip would be positioned away from and out of clamping engagement with the filter body.

Referring particularly to FIGS. 4, 6 and 8, as noted earlier in the figure description, the clip 25 as illustrated in FIG. 4 is in clamping or closed position wherein the arm 26 carrying the elongate member 21 maintains the elongate member 21 in biased clamping engagement with the filter body 13. It should be particularly noted that the base portion 26a of the arm 26 has been pivotally positioned inwardly past dead center so that a resilient biasing action is maintained on the filter body 13 by the biasing action on the arm 26 by the resilient fingers 27a, 27b. Now comparing the position of the clip 25 in FIG. 4 with that shown in FIG. 6, it will be noted that FIG. 6 discloses an intermediate open position for the clip wherein the elongate member 21 would be out of engagement with the filter body 13. In this intermediate open position the base portion 26a of the arm 26 is vertically disposed or in a neutral position with reference to the resilient finger 27b. It will be understood that in this position the arm 26 is in a cocked open position which would facilitate the changing of filter bodies.

Referring now to FIG. 8 and comparing the same with FIG. 6, it will be understood that the elongate member 26 has now been moved to the fully open position which would be the normal position that the rods would be moved to when initially removing old filter media prior to replacing the same. The intermediate open position illustrated in FIG. 6 would oftentimes be used after filter media has been removed for example, but prior to replacing the new filter media. It will be understood that with the elongate member in the intermediate open position of FIG. 6, there is a shorter distance to be traveled for clampingly biasing the newly replaced filter media 13. Thus, for some installations it might be more convenient to have the elongate members 21 in this intermediate open position immediately prior to clampingly securing the filter media to the frame 10.

Referring now briefly to the flat type of filter assembly 50 of FIG. 2, it will be noted that a supporting frame 51 is provided, having a foraminous filter body support 52 in the form of screen wiring carried by the frame 51, and a filter body 53 formed of resilient filter media overlying the screen wiring support 52. Since the clamping means for the filter body 53 is of the same type as already described for the V-cell type filter, no need is seen in any further description thereof except to note that the same parts bear the same reference numerals with the prime notation added.

It will thus be understood that there has been disclosed a filter assembly wherein the clamping means may quickly be manually moved from an open to a clamping position for facilitating the replacement of filter media and wherein the clamping means utilizes an elongate rod which may readily be manually grasped to serve as a handle for pivotally swinging the clamping means to the desired open or closed position.

In the drawings and specification there has been set forth a preferred embodiment of the invention and although specific terms have been employed, they are used in a generic and descriptive sense only and not for purposes of limitation.

That which is claimed is:

1. A filter assembly comprising a supporting frame, a foraminous filter body support carried by said frame, a filter body formed of resilient filter media overlying said support, and clamping means mounted on said supporting frame and resiliently engaging marginal areas of said filter body for maintaining the filter body in overlying relation on said support, said clamping means comprising elongate members extending substantially parallel to marginal edge portions of the filter body along a plurality of sides of the filter body and engaging marginal facial portions of the filter media forming the filter body, and clips supportingly carrying said elongate members along the marginal areas of said filter body, each clip having an arm connected to said elongate member for carrying the same, said arms being pivotally movable to first and second positions and wherein in the first position said elongate members carried by the respective arms are in biased spring clamping engagement with said filter body and wherein in the second position said elongate members are away from and out of clamping engagement with said filter body to facilitate replacement of the filter body.

2. A filter assembly according to claim 1 wherein said elongate members are formed of metal rods provided with an irregular surface for enhancing the clamping effect on the resilient filter media.

3. A filter assembly according to claim 1 wherein said elongate members are formed of cylindrical rods and said arms are weldably connected to said rods, said arms having arcuate outer end portions for increasing the area of weldable connection with said rods.

4. A filter assembly comprising a supporting frame, a foraminous filter body support carried by said frame, a filter body formed of resilient filter media overlying said support, and clamping means mounted on said supporting frame and resiliently engaging marginal areas of said filter body for maintaining the filter body in overlying relation on said support, said clamping means comprising elongate members extending substantially parallel to marginal edge portions of the filter body along a plurality of sides of the filter body and engaging marginal facial portions of the filter media forming the filter body, and clips supportingly carrying said elongate members along the marginal edges of said filter body, each clip having a supporting element for mounting the clip adjacent the marginal edges of said filter body, each clip also having an arm pivotally carried by said supporting element and selectively movable to first and second pivoted positions, each arm being connected to one of said elongate members for carrying the same, said arms when in the first pivoted position positioning the respective carried elongate members in spring biased clamping engagement with said filter body and when in the second pivoted position positioning said elongate members carried thereby away from and out of clamping engagement with said filter body to facilitate replacement of the filter body.

5. A filter assembly according to claim 4 wherein said elongate members are formed of metal rods provided with an irregular surface for enhancing the clamping effect on the resilient filter media.

6. A filter assembly according to claim 4 wherein said elongate members are formed of cylindrical rods and said arms are weldably connected to said rods, said arms having arcuate outer end portions for increasing the area of weldable connection with said rods.

7. A filter assembly according to claim 4 wherein said supporting element of each clip comprises a plate having a plurality of resilient fingers extending outwardly in the same general direction along both sides of the respective arm member and resiliently sandwiching therebetween portions of said arm.

8. A filter assembly according to claim 7 wherein each of said arms has a relatively wide base portion having a width corresponding substantially to the collective width of said resilient fingers and wherein said resilient fingers sandwich said base portion therebetween.

9. A filter assembly according to claim 8 wherein some of said resilient fingers extending along one side of each arm have curved outer end portions to aid in retaining the base portion of the arm sandwiched between the resilient fingers.

* * * * *